US011429429B2

(12) United States Patent
Sawdon et al.

(10) Patent No.: US 11,429,429 B2
(45) Date of Patent: Aug. 30, 2022

(54) PREFETCH CHAINING FOR OPTIMIZING DATA READ-AHEAD FOR WORKFLOW AND ANALYTICS

(71) Applicant: International Business Machines Corporation, Armonk, NY (US)

(72) Inventors: Wayne Sawdon, San Jose, CA (US); Deepavali M. Bhagwat, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/134,715

(22) Filed: Dec. 28, 2020

(65) Prior Publication Data
US 2021/0117228 A1 Apr. 22, 2021

Related U.S. Application Data

(63) Continuation of application No. 16/144,984, filed on Sep. 27, 2018, now Pat. No. 10,901,778.

(51) Int. Cl.
*G06F 9/48* (2006.01)
*G06F 9/50* (2006.01)

(52) U.S. Cl.
CPC .......... *G06F 9/485* (2013.01); *G06F 9/5083* (2013.01)

(58) Field of Classification Search
CPC ................................ G06F 9/485; G06F 9/5083
See application file for complete search history.

(56) References Cited

U.S. PATENT DOCUMENTS

| 6,070,230 | A | 5/2000 | Capps |
| 7,529,892 | B2 | 5/2009 | Matsuzawa et al. |
| 7,676,630 | B2 | 3/2010 | Qiao |
| 8,225,070 | B2 | 7/2012 | Okawara et al. |
| 9,047,198 | B2 | 6/2015 | Kannan et al. |
| 9,323,680 | B1 | 4/2016 | Tommi et al. |
| 9,430,392 | B2 | 8/2016 | Jain et al. |
| 11,294,810 | B2 * | 4/2022 | Walker ................ G06F 11/3027 |
| 11,295,229 | B1 * | 4/2022 | Kumar .................. G06N 20/00 |
| 2009/0198909 | A1 | 8/2009 | Speight |

(Continued)

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Sisley N Kim
(74) *Attorney, Agent, or Firm* — Sherman IP LLP; Kenneth L. Sherman; Steven Laut

(57) ABSTRACT

One embodiment provides a method for optimizing data read-ahead for machine learning applications including obtaining, by a processor, next file information from a workflow scheduler for next input files for a next processing stage that are to be accessed by a machine learning application. Data for the next processing stage for the machine learning application and at least one system job is prefetched. The next input files are prefetched as the prefetching data reaches an end of current inputs. A schedule is caused to chain the next input files for the next processing stage to current input files of a current processing stage.

20 Claims, 7 Drawing Sheets

(56) References Cited

U.S. PATENT DOCUMENTS

| | | | |
|---|---|---|---|
| 2011/0093667 A1* | 4/2011 | Mise | G06F 12/0862 |
| | | | 711/E12.001 |
| 2017/0286304 A1 | 10/2017 | Peled et al. | |
| 2019/0073590 A1* | 3/2019 | Wu | G06F 9/00 |
| 2019/0278870 A1 | 9/2019 | Novielli | |
| 2020/0073576 A1* | 3/2020 | Montero | G06F 3/0653 |

OTHER PUBLICATIONS

IBM, "Readahead prefetching," IBM Knowledge Center, retrieved on Nov. 6, 2017 from https://www.ibm.com/support/knowledgecenter/en/SSEPGG_10.1.0/com.ibm.db2.luw.admin.perf.doc/doc/c0058907.html, pp. 1, United States.

IBM, "Sequential prefetching," IBM Knowledge Center, retrieved on Nov. 6, 2017 from https://www.ibm.com/support/knowledgecenter/en/SSEPGG_10.1.0/com.ibm.db2.luw.admin.perf.doc/doc/c0005397.html, pp. 1-2, United States.

List of IBM Patents or Patent Applications Treated as Related; Sawdon, W., U.S. Appl. No. 16/144,984, filed Sep. 27, 2018.

* cited by examiner

PREFETCH CHAINING FOR OPTIMIZING DATA READ-AHEAD FOR WORKFLOW AND ANALYTICS

BACKGROUND

Many cognitive applications today place a premium on the time required to perform analytics on a data stream and determine the result. High speed trading, natural language chatbots, recommendation systems, news filters and many others all strive to minimize the time required for analytics. File systems are optimized for generic workloads where different users access seemingly random files. When a file is accessed, the file system monitors the user's access to determine the access pattern. Once the pattern is known, the file system begins reading ahead of the user requests hoping to reduce or eliminate the input/output (I/O) latency. Often the read-ahead distance is monitored. If the user is waiting for a reads to complete, then the read-ahead distance will be increased. If the read-ahead completes long before the user requests the data, then the read-ahead distance is shortened. Ideally, the read-ahead request completes just prior to the user read request and thus minimizes the buffer space consumed for that file and observed latency. The data required for most analytics jobs far exceeds the buffer space in the machine(s) where the analytics is run. Training data for machine learners is often 100's of gigabytes (GBs), whereas genomic data frequently requires terabytes (TBs) of data. Thus, the read-ahead is important for these types of applications to minimize the read latency and therefore, the total time required to obtain the result. In most analytical workflows, such as genomic sequencing, the analytics are performed in stages, where the output from one stage is combined with other data files as the input to the next stage. In a like manner, the training for machine learners often re-read the same input files hundreds of times, each time refining their model. Unfortunately, the file system is unaware of the stages and it waits for each file to be accessed to begin the read-ahead process and tune the read-ahead distance. Consequently, the time for the analytics increases, which reduces the value of its result.

SUMMARY

Embodiments relate to prefetch chaining for optimizing data read-ahead for workflow and analytics. One embodiment provides a method for optimizing data read-ahead for machine learning applications including obtaining, by a processor, next file information from a workflow scheduler for next input files for a next processing stage that are to be accessed by a machine learning application. Data for the next processing stage for the machine learning application and at least one system job is prefetched. The next input files are prefetched as the prefetching data reaches an end of current inputs. A schedule is caused to chain the next input files for the next processing stage to current input files of a current processing stage.

These and other features, aspects and advantages of the present invention will become understood with reference to the following description, appended claims and accompanying figures.

DETAILED DESCRIPTION

Figure 1:
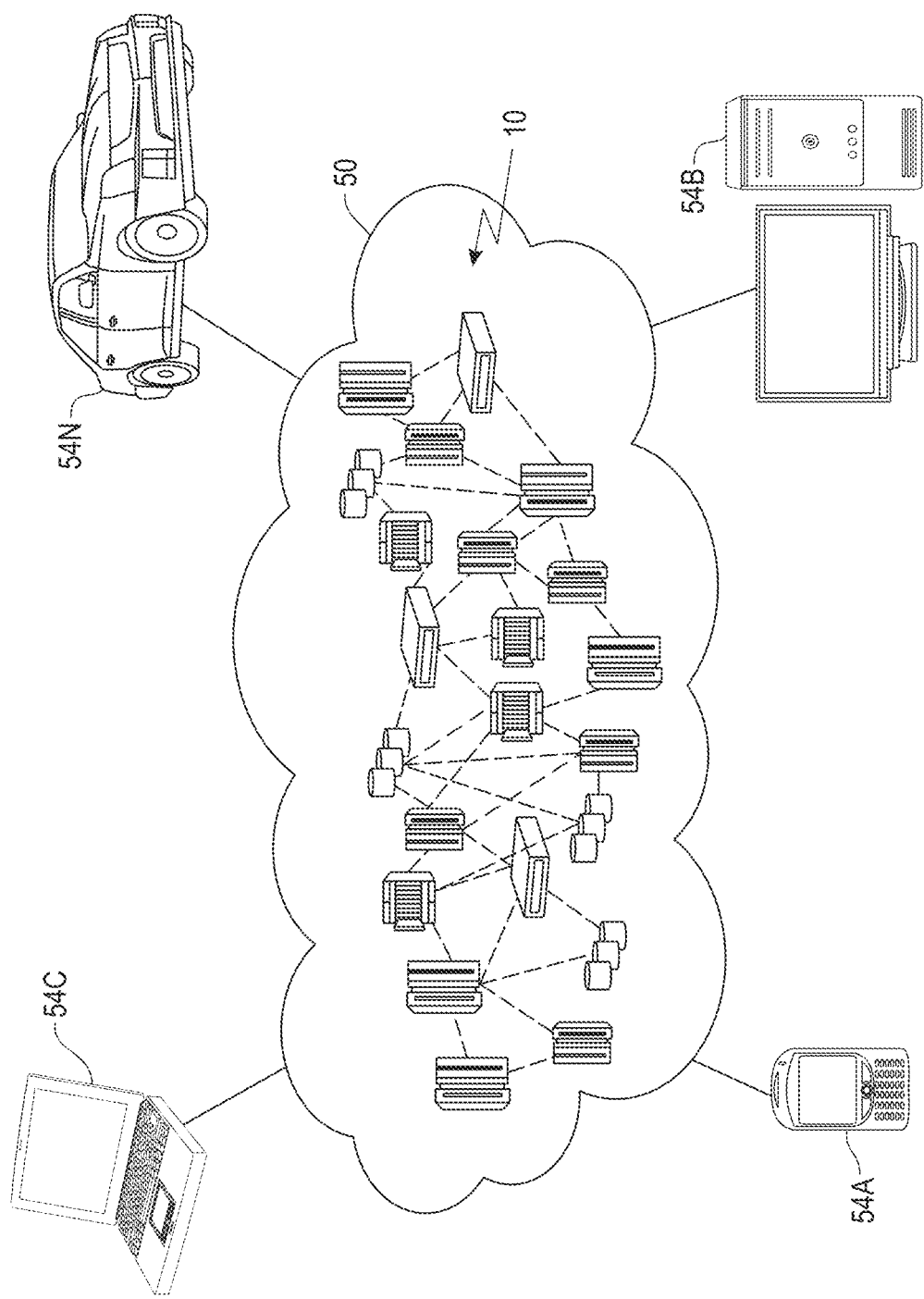
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Embodiments relate to prefetch chaining for optimizing data read-ahead for workflow and analytics. A chain consists of a predefined sequence or several iterations of accessing a set of files. One embodiment provides a method for optimizing data read-ahead for analytical workflows and analytics applications including obtaining, by a processor, next file information from a workflow scheduler for next files for a next processing stage that are to be accessed by a process. Data for the next processing stage for at least one application and at least one system job is prefetched. The next files are prefetched as the prefetching data reaches an end of current inputs.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
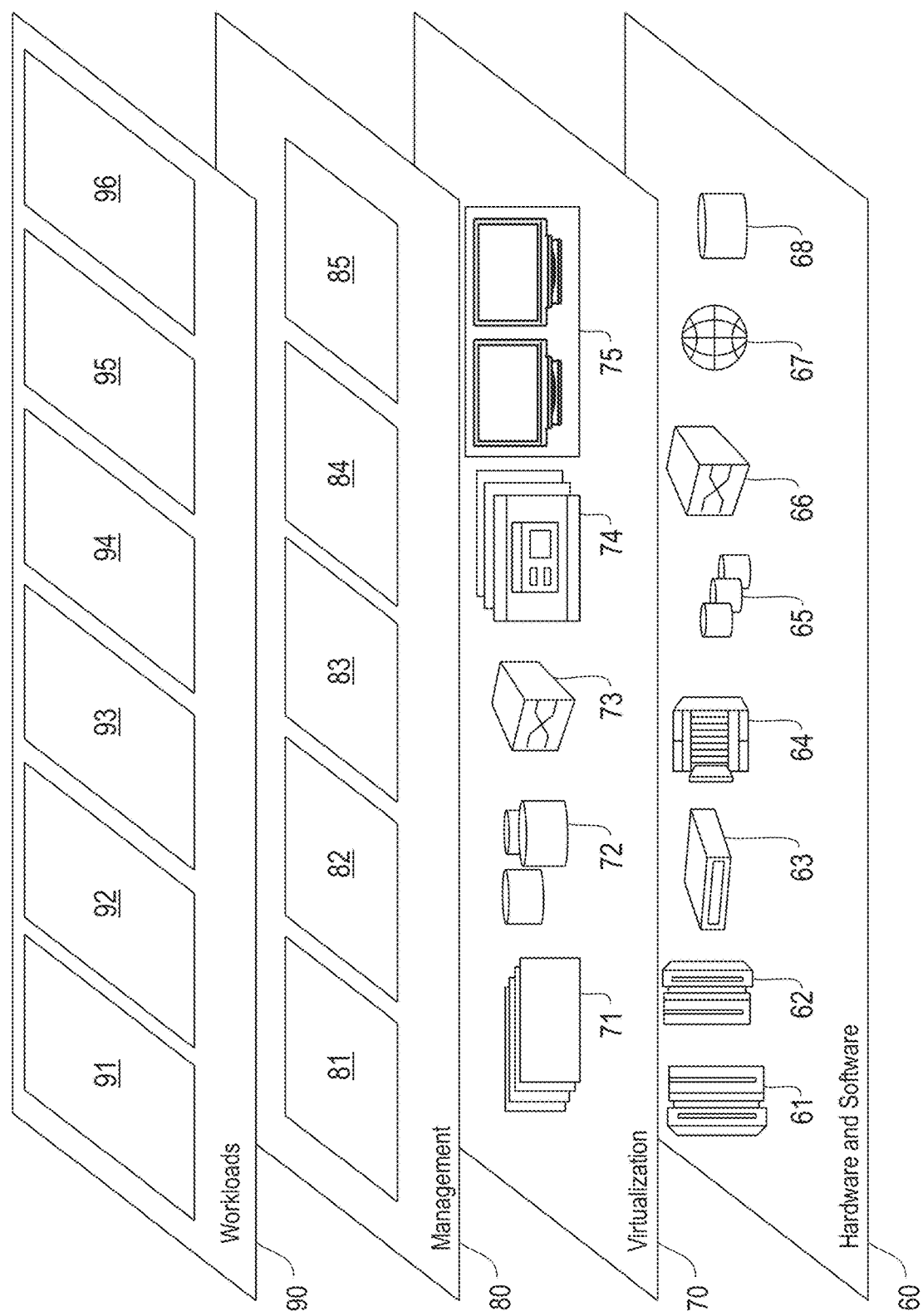
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for optimizing data read-ahead for workflow and analytics processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3), hardware system 400 (FIG. 4) or the cloud computing environment 50 (FIG. 1), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
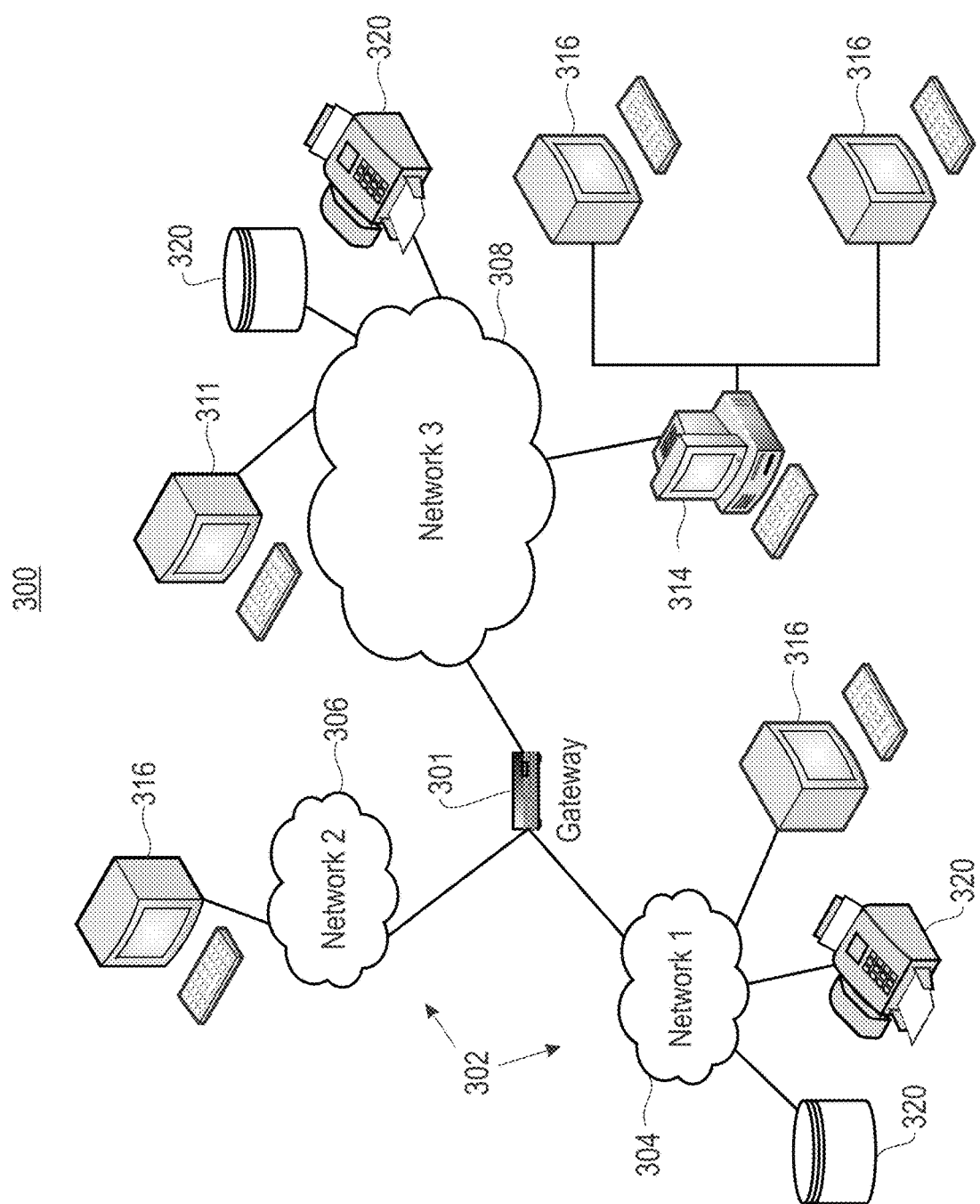
FIG. 3 is a network architecture of a system for prefetch chaining for optimizing data read-ahead for workflow and analytics, according to an embodiment.

FIG. 3 is a network architecture of a system 300 for prefetch chaining for optimizing data read-ahead for workflow and analytics, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
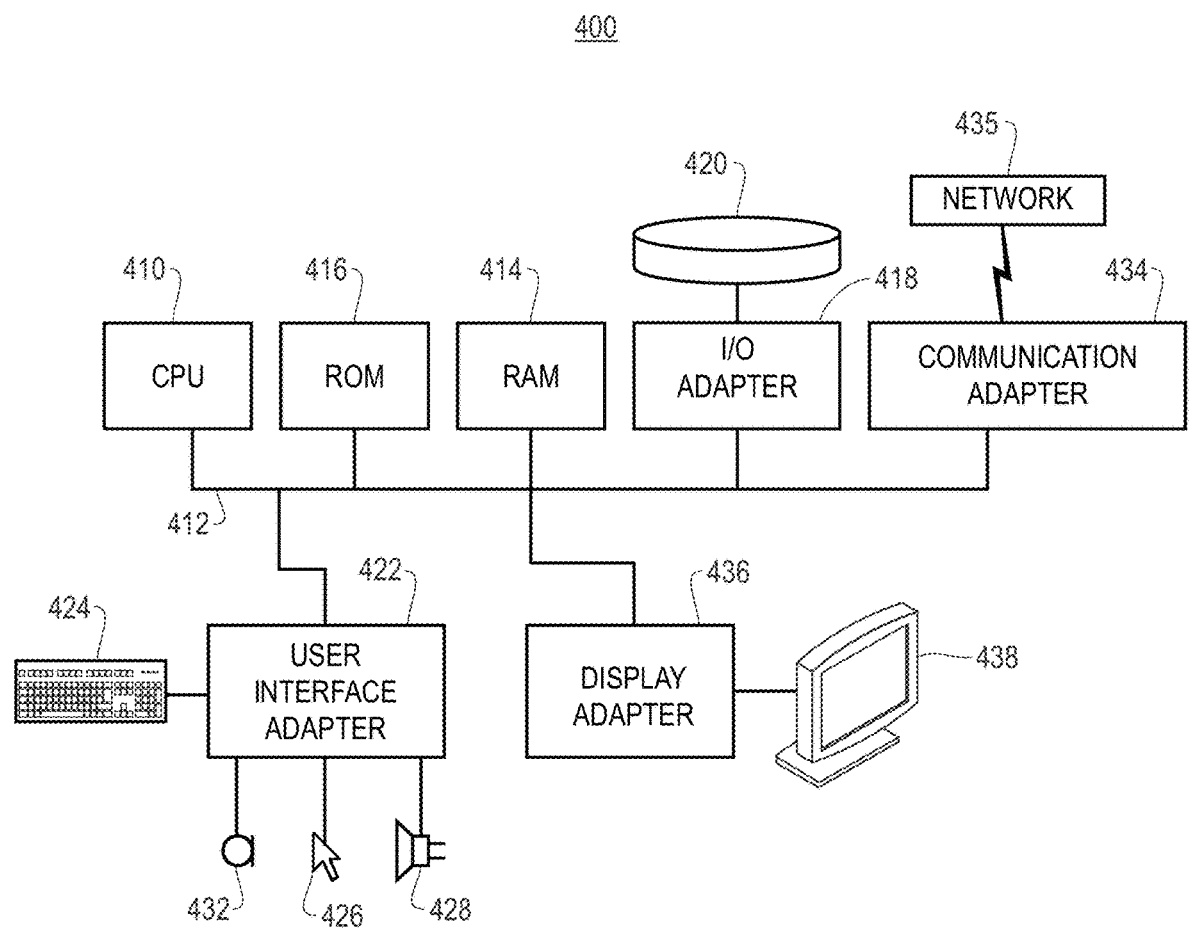
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
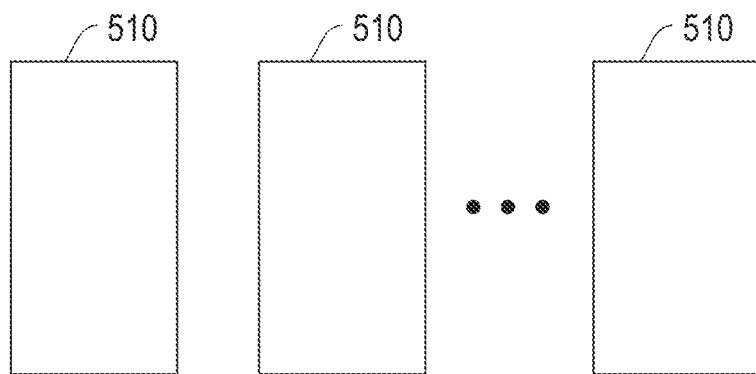
FIG. 5 is a block diagram illustrating a distributed system for prefetch chaining for optimizing data read-ahead for workflow and analytics, according to one embodiment.
Figure 5:
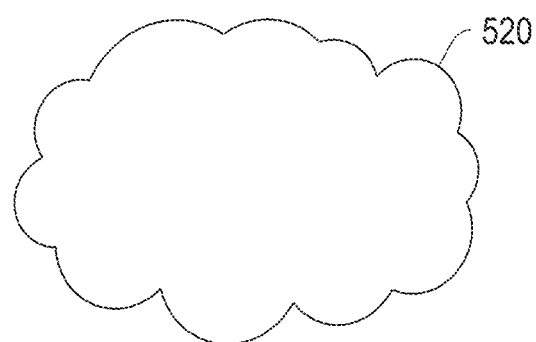
Figure 5:
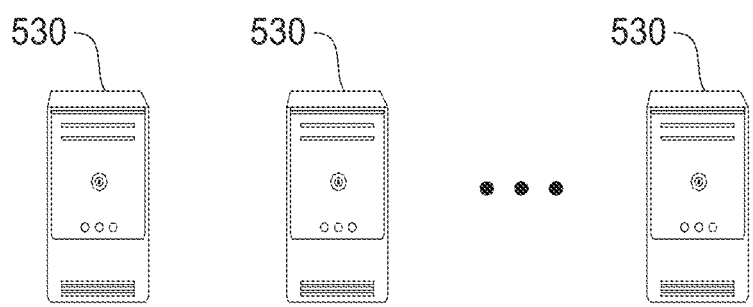

FIG. 5 is a block diagram illustrating a system 500 that may be employed for XXX, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

Figure 6:
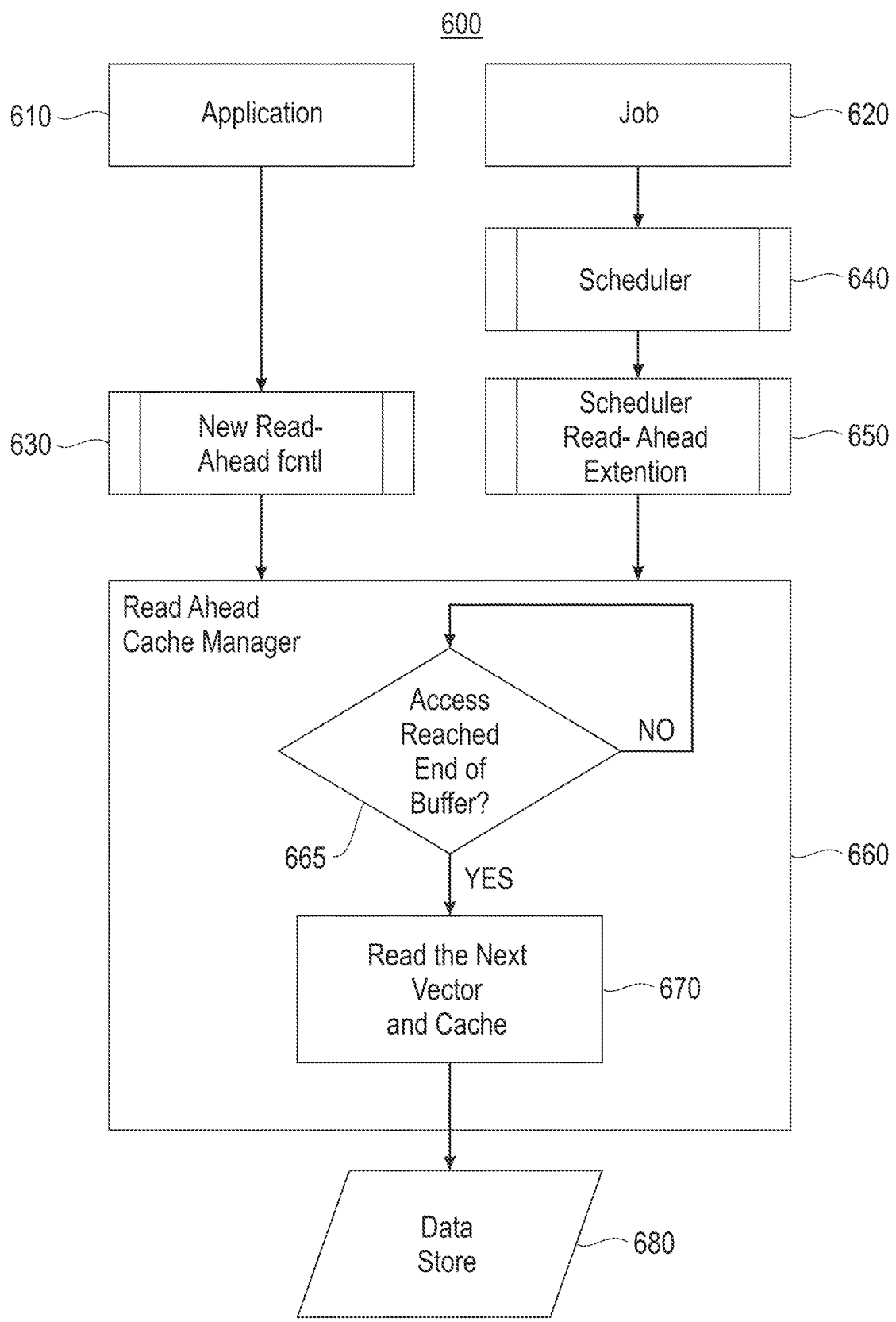
FIG. 6 illustrates an architecture for prefetch chaining for optimizing data read-ahead for analytical workflows, according to one embodiment.

In ideal prefetching, the file system (e.g., a file system(s) in computing node 10, FIG. 1, hardware and software layer 60, FIG. 2, processing system 300, FIG. 3, system 400, FIG. 4, system 500, FIG. 5, architecture 600, FIG. 6, etc.), prefetches data into cache just prior to user access, reduces processing/memory usage cost on mispredictions, balances latency to storage with user's consumption rate, and accounts for load on the storage components/CPU(s). Ideal prefetching further involves that the file system continuously monitors/adjusts prefetch distance to achieve ideal trade-off between buffer space used and observed Input/Output (I/O) latency, where prefetch distance is not hard coded and varies.

A machine learning (ML) algorithm is used in the training step of the workflow for analytic workflows. Output of ML (a trained model) is then used in the prediction part of the workflow. The difference between a good and a bad ML algorithm is the quality of predictions obtained during the prediction step. One purpose of ML is to learn from training data in order to make as good as possible predictions on new, unseen, data. Deep learning (DL) is a subfield of ML concerned with algorithms inspired by the structure and function of the brain called neural networks (NNs) or artificial NNs (ANNs). DL is part of a broader family of ML processing based on learning data representations. DL architectures (e.g., deep NNs (DNNs)) have been applied to fields including computer vision, speech recognition, natural language processing, audio recognition, social network filtering, machine translation, bioinformatics, drug design and board game programs, where they have produced results comparable to and in some cases exceeding those of human experts. A DNN is an ANN with multiple layers between the input and output layers. The DNN finds the correct mathematical manipulation to turn the input into the output, whether it be a linear relationship or a non-linear relationship. The DNN moves through the layers calculating the probability of each output.

For analytic workflows, ML/DL training re-reads the same training file 100s of times (for 100s gigabytes (GBs) to few terabytes (TBs) of data). For SPARK® workflows, output from one step is input to the next. In genomic workflows (e.g., Genome Analysis Toolkit (GATK) used for analyzing next-generation resequencing data), in each workflow case, the scheduler knows the next stage in the pipeline and knows what inputs it requires.

In one embodiment, system 500 includes a new file system read-ahead function "fcntl" call (New read-ahead fcntl 630, FIG. 6) is defined to allow the schedule (from the scheduler, e.g., scheduler 640, FIG. 6) to chain the next stage's input files to the current stage's input files. The next stage's input file may be the same as the current stage's (e.g., to re-read the same input file), or the next stage's input files may be this stage's output file, or it could be an unrelated file in the same file system. In one embodiment, the file system in system 500 reads ahead on the current stage's input files and when the read-ahead reaches the end, the file system consults the chain information, which is a predefined sequence or iterations of a pattern of file accesses and immediately begins the read-ahead on the next stage's input files at the same read-ahead distance. The next stage read-ahead distance is merely an estimate and is monitored (e.g., by the read-ahead cache manager 660, FIG. 6) and adjusted as needed.

FIG. 6 illustrates an architecture 600 for prefetch chaining for optimizing data read-ahead for analytical workflows, according to one embodiment. In one embodiment, the architecture 600 includes application 610, job 620, new read-ahead fcntl 630, scheduler 640, scheduler specific read-ahead extension 650, read-ahead cache manager 660 and data store 680.

In one embodiment, the workflow scheduler 640 informs the file system of the next files to be accessed. As the file system prefetch reaches the end of current inputs, it automatically begins prefetching the next files. In one embodiment, prefetching works continuously across files without waiting for a first user access to the file. The architecture 600 reuses a computed prefetch distance as the initial distance for the next processing stage. In one embodiment, for architecture 600, the read-ahead cache manager 660 may end up prefetching more than one file for the next stage (and can include preloading the next stage executable). In one embodiment, ML/DL can continue prefetching to the start of the same training file.

In one embodiment, the application 610 includes at least one ML/DL model. The job 620 specifies the sequence of steps/stages and the inputs to be provided to each stage. The input may be in the form of constants or tuning parameters provided on the command line or in configuration files and data files. The job also specifies the output in the form of values and files. The output from job 620 is input to the scheduler 640. The scheduler (specific) read-ahead extension 650 inspects the stages in the job, the inputs at various stages and then creates a vector of file access that is uses to update it's I/O queues. The new read-ahead fcntl 630 function provides for the schedule from the application to chain the next stage's input files to the current stage's input files for the application 610. The output from the scheduler read-ahead extension 650 and the new read-ahead fcntl 630 are provided to the read-ahead cache manager 660. In one embodiment, the read-ahead cache manager 660 determines if access reached the end of a buffer in block 665. If the read-ahead cache manager 660 determines that access has not reached the end of a buffer in block 665, the architecture 600 proceeds back to block 665 until access has reached the end of a buffer in block 665. The architecture 600 then proceeds to block 670 to read the next vector and cache. The output of block 670 is stored in a data store 680 (e.g., a repository, storage disk, etc.).

Figure 7:
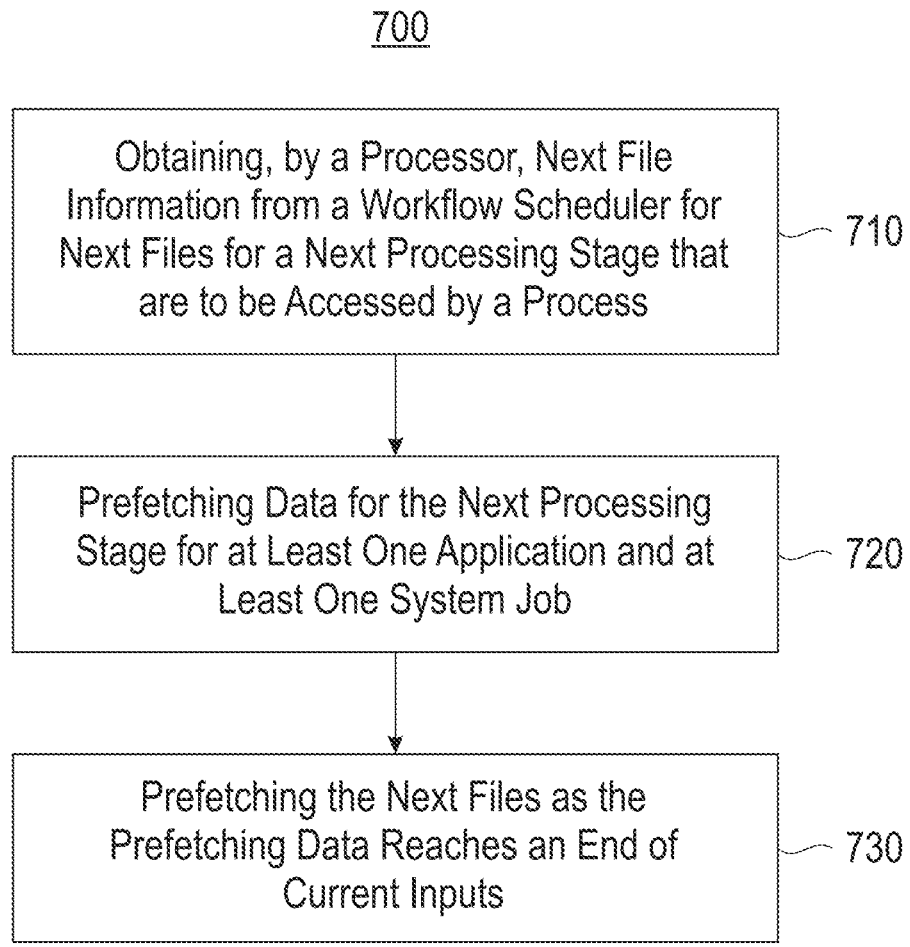
FIG. 7 illustrates a block diagram of a process for prefetch chaining for optimizing data read-ahead for analytical workflows and applications, according to one embodiment.

FIG. 7 illustrates a block diagram for process 700 for prefetch chaining for optimizing data read-ahead for analytical workflows and applications, according to one embodiment. In block 710, process 700 obtains, by a processor (e.g., a processor from computing node 10, FIG. 1, hardware and software layer 60, FIG. 2, processing system 300, FIG. 3, system 400, FIG. 4, system 500, FIG. 5, architecture 600, FIG. 6, etc.), next file information from a workflow scheduler (e.g., scheduler 640 and scheduler read-ahead extension 650, FIG. 6) for next files for a next processing stage that are to be accessed by a process (e.g., an analytical workflow(s) or an analytics application(s) (e.g., application 610, FIG. 6). In block 720, process 700 provides for prefetching data for the next processing stage for the process and at least one system job (e.g., job 620, FIG. 6). In block 730, process 700 provides for prefetching the next files as the prefetching data reaches an end of current inputs.

In one embodiment, in process 700 prefetching data is performed continuously across files without waiting for a first user access to a file. In one embodiment, the workflow scheduler reuses a computed prefetch distance as an initial prefetch distance for a next processing stage.

In one embodiment, in process 700 a read-ahead cache manager (e.g., read-ahead cache manager 660) prefetches multiple next files for the next processing stage and preloads a next stage executable. In one embodiment, in process 700 the analytical workflow or analytics application is a model application that is at least one machine learning model, a deep learning model, etc., and the model application continues prefetching to a start of a same training file.

In one embodiment, in process 700 prefetching data is performed continuously across the model application and the at least one system job working sets. In one embodiment, prefetching is performed across file boundaries. In one embodiment, in process 700 native file system prefetching is integrated with a job scheduler (e.g., scheduler 640, FIG. 6)

using a scheduler read-ahead extension 650, FIG. 6). In one embodiment, the analytical workflow or analytics application provides a file system with a data flow or a stage sequence for prefetching a working set of the analytical workflow or analytics application using a read-ahead function (e.g., new read-ahead fcntl 630, FIG. 6) for the file system and a read-ahead extension for the scheduler (e.g., read-ahead extension 650).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C.

section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for optimizing data read-ahead for machine learning applications comprising:
    obtaining, by a processor, next file information from a workflow scheduler for next input files for a next processing stage that are to be accessed by a machine learning application;
    prefetching data for the next processing stage for the machine learning application and at least one system job;
    prefetching the next input files as the prefetching data reaches an end of current inputs; and
    causing a schedule to chain the next input files for the next processing stage to current input files of a current processing stage;
    wherein the workflow scheduler reuses a prefetch distance as an initial prefetch distance, and subsequent prefetch distances are adjusted based on buffer space used and observed input/output (I/O) latency.

2. The method of claim 1, wherein the machine learning application comprises at least one machine learning model or a deep learning model, and the model application continues prefetching to a start of a same training file.

3. The method of claim 1, wherein the initial prefetch distance is computed and is reused as an initial prefetch distance for the next processing stage.

4. The method of claim 3, wherein the subsequent prefetch distances are continuously monitored, and the subsequent prefetch distances are adjusted based on a trade-off determination that is determined between the buffer space used and the observed I/O latency.

5. The method of claim 3, wherein a function provides for the schedule to form a chain that includes a predefined sequence for accessing a set of input files that includes the next input files and the current input files.

6. The method of claim 2, wherein a read-ahead cache manager prefetches multiple next input files for the next processing stage and preloads a next stage executable.

7. The method of claim 6, wherein:
    prefetching data is performed continuously across the machine learning application and the at least one system job working sets;
    prefetching is performed across file boundaries; and
    native file system prefetching is integrated with a job scheduler.

8. The method of claim 6, wherein an input file comprises constants or tuning parameters that are provided on a command line or in configuration files and data files.

9. A computer program product for optimizing data read-ahead for machine learning applications, the computer program product comprising a non-transitory computer readable storage medium having program instructions embodied therewith, the program instructions executable by a processor to cause the processor to:
    obtain, by the processor, next file information from a workflow scheduler for next input files for a next processing stage that are to be accessed by a machine learning application;
    prefetch, by the processor, data for the next processing stage for the machine learning application and at least one system job;
    prefetch, by the processor, the next input files as the prefetching data reaches an end of current inputs; and
    cause, by the processor, a schedule to chain the next input files for the next processing stage to current input files of a current processing stage;
    wherein the workflow scheduler reuses a prefetch distance as an initial prefetch distance, and subsequent prefetch distances are adjusted based on buffer space used and observed input/output (I/O) latency.

10. The computer program product of claim 9, wherein the machine learning application comprises at least one machine learning model or a deep learning model, and the model application continues prefetching to a start of a same training file.

11. The computer program product of claim 9, wherein the initial prefetch distance is computed and is reused as an initial prefetch distance for the next processing stage.

12. The computer program product of claim 11, wherein the subsequent prefetch distances are continuously monitored, and the subsequent prefetch distances are adjusted based on a trade-off determination that is determined between the buffer space used and the observed I/O latency.

13. The computer program product of claim 11, wherein a function provides for the schedule to form a chain that includes a predefined sequence for accessing a set of input files that includes the next input files and the current input files, and a read-ahead cache manager prefetches multiple next input files for the next processing stage and preloads a next stage executable.

14. The computer program product of claim 13, wherein:
    prefetching data is performed continuously across the model application and the at least one system job working sets;
    prefetching is performed across file boundaries; and
    native file system prefetching is integrated with a job scheduler.

15. The computer program product of claim 13, wherein an input file comprises constants or tuning parameters that are provided on a command line or in configuration files and data files.

16. An apparatus comprising:
    a memory configured to store instructions; and
    a processor configured to execute the instructions to:

obtain next file information from a workflow scheduler for next input files for a next processing stage that are to be accessed by a machine learning application;

prefetch data for the next processing stage for the machine learning application and at least one system job;

prefetch the next input files as the prefetching data reaches an end of current inputs; and cause a schedule to chain the next input files for the next processing stage to current input files of a current processing stage;

wherein the workflow scheduler reuses a prefetch distance as an initial prefetch distance, and subsequent prefetch distances are adjusted based on buffer space used and observed input/output (I/O) latency.

17. The apparatus of claim 16, wherein:

the machine learning application comprises at least one machine learning model or a deep learning model;

the model application continues prefetching to a start of a same training file;

the process comprises an analytical workflow or an analytics application; and the initial prefetch distance is computed and is reused as an initial prefetch distance for the next processing stage.

18. The apparatus of claim 17, wherein:

the subsequent prefetch distances are continuously monitored, and the subsequent prefetch distances are adjusted based on a trade-off determination that is determined between the buffer space used and the observed I/O latency; and a function provides for the schedule to form a chain that includes a predefined sequence for accessing a set of input files that includes the next input files and the current input files.

19. The apparatus of claim 17, wherein: a read-ahead cache manager prefetches multiple next input files for the next processing stage and preloads a next stage executable.

20. The apparatus of claim 19, wherein:

prefetching data is performed continuously across the machine learning application and the at least one system job working sets;

prefetching is performed across file boundaries;

native file system prefetching is integrated with a job scheduler; and an input file comprises constants or tuning parameters that are provided on a command line or in configuration files and data files.

\* \* \* \* \*